J. PATTISON.
Dumping Wagon and Sleigh.
No. 165,609.
Patented July 13, 1875.
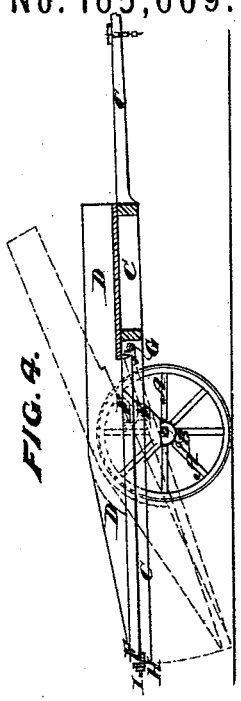
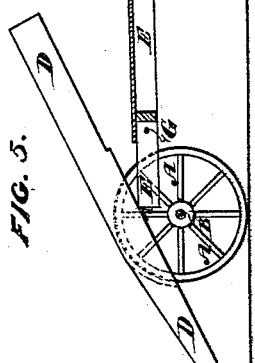
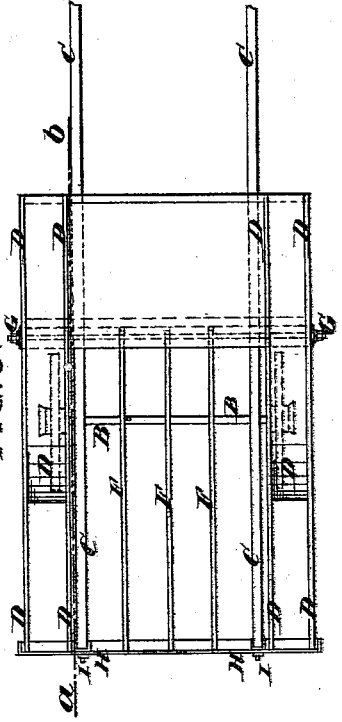
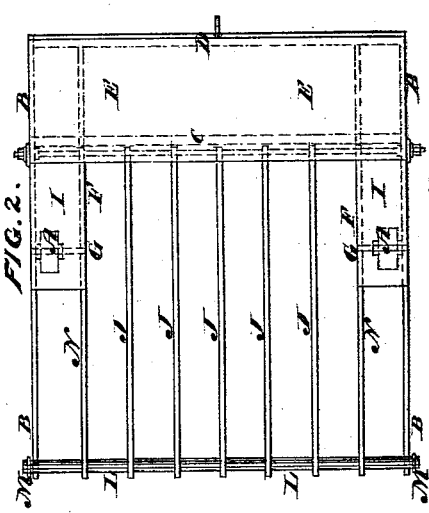
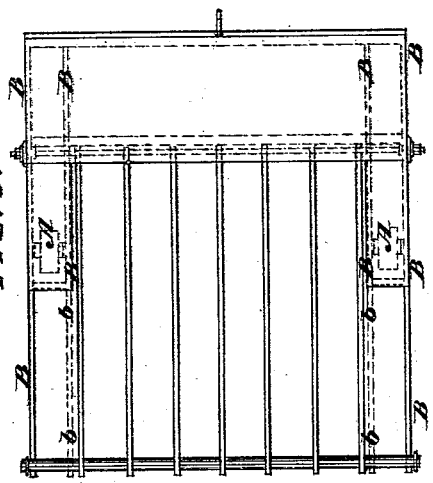
Witnesses:
David Fulton
John MacNish
Inventor:
James Pattison

UNITED STATES PATENT OFFICE.

JAMES PATTISON, OF DARNLEY MILL, HURLET, NORTH BRITAIN.

IMPROVEMENT IN DUMPING WAGONS OR SLEIGHS.

Specification forming part of Letters Patent No. 165,609, dated July 13, 1875; application filed February 24, 1875.

*To all whom it may concern:*

Be it known that I, JAMES PATTISON, of Darnley Mill, Hurlet, in the county of Renfrew, North Britain, have invented a new or Improved Sleigh for carrying or collecting grass, hay, and grain crops, of which the following is a specification:

This invention relates to a new or improved sleigh or carriage intended to facilitate the collecting and discharging of grass, hay, and grain crops. It consists of a framing supported upon trams or wheels, the upper part of the said framing being composed of movable bars, hinged, or otherwise attached, to the front or other portion of the framing, the said bars constituting a platform upon which the crops to be collected are placed.

Figure 1 on the annexed sheet of drawings is a vertical section of a sleigh or carriage more especially adapted for field use, and constructed in accordance with my invention, Fig. 2 being a plan of the same.

Although the drawings represent the sleigh or carriage constituting my invention as carried upon wheels A, it is to be understood that it may also be supported upon trams, as indicated by the dotted lines *a*, Fig. 1.

The carriage is composed, as shown, of two fixed side-bars B, which are tied together at the front ends by cross-bars C D, the bars C D and front portion of the framing, being covered or "cross-clad" by means of boarding, E. Shorter bars F are placed parallel to the two fixed side bars B, the wheels A running between the bars F and B, upon axles G, which are fixed to the said bars by brackets H. In order to shield the wheels A from the load upon the carriage, the space between the bars B and F is covered over with boarding, I, or other suitable material. The movable bars J are hinged at one end to a pivot-bar, K, extending across the frame and situate beneath the boarding E, while their other ends are supported at the same level by means of a cross-bar, L, which cross-bar L is supported at each end by the fixed side bars B, and held in position by means of skewers or bolts, M, which pass through the bar L, and also through staples fixed to the side bars B. In order to extend the shorter bars F to the back of the carriage, movable bars N are hinged to the ends of the said bars F, the opposite ends of the bars N resting upon the hind cross-bar L.

Fig. 3 is a plan of a carriage or sleigh, similar to that hereinbefore described, with reference to Figs. 1 and 2, with the exception that the wheels A are fixed to the axle instead of revolving thereon, and the fixed side bars B are made double, the wheels A running between. The inner side bars B may either be stopped, after passing the wheels, and joined by cross-pieces to the outer bars, as shown on the drawings, or they may be prolonged to the back of the carriage, as indicated in dotted lines marked *b*, or the inner and outer bars may be made to converge towards each other, or toward a central bar.

In operating with the sleigh or carriage hereinbefore described, the load is built or deposited upon the framing while the movable bars J and N are in the position shown in full at Fig. 1 of the drawings. When it is wished to drop the load in any required position the hind cross-bar L is removed, after withdrawing the skewers or bolts M, when the movable bars drop into the position indicated in dotted lines at Fig. 1 of the drawings, thus bringing these portions of the load between and outside of the bars in contact with the earth, and presenting an inclined plane down which the load slips as the sleigh is withdrawn from beneath it, leaving the load upon the ground.

Figs. 4 and 5 are vertical sections of a carriage more especially adapted to the conveyance of crops upon roads and for general purposes. Fig. 6 is a plan of the same. The modification of my invention illustrated by these figures is provided, as shown, with a large size of wheels, A, which revolve upon or are fixed to an axle, B, carried in bearings secured to the fixed bars C, which in this case are merely continuations of the trams or shafts whereby a horse may be harnessed to the carriage. In order to shield the wheels from the load, they are provided with box-covers D, which may be fixed, but which are preferably made movable and hinged or otherwise coupled to fixed bars E, which extend from the front of the framing to within a short distance from the vertical plane in which the axis of the wheels A is situated; or, instead of hinging the box-covers D to the fixed bars E, as shown, they may be secured to the front of the carriage by a rope or chain and allowed to slide over the bars E with the load, in which case the bars E may be provided with rollers to lessen the consequent friction. The movable bars F are hinged to a bar or rod, G, and their other ends rest on a hind cross-bar, H, which is attached by tongues I to the ends of the fixed bars C. A portion of the front of the framing is covered with boarding similarly to Figs. 1, 2, and 3, as hereinbefore described.

In unloading, the hind cross-bar H is removed, allowing the movable bars F, and box-covers D, to fall into the position indicated by the dotted lines at Fig. 4, and (in reference to the box-covers D) in full lines, at Fig. 5, whereupon the load on the inclined plane thus presented to it, allows the carriage to be drawn from beneath it, and the load becomes deposited on the ground.

I claim—

The combination in a sled or wagon of a movable platform, loosely connected at one end to the frame, and a detachable cross-bar for supporting the opposite end of the platform, all as and for the purpose set forth.

In testimony whereof I have signed my name to this specification in the presence of two subscribing witnesses.

JAMES PATTISON. [L. S.]

Witnesses:
DAVID FULTON,
JOHN MACNISH.